United States Patent [19]

Adrian et al.

[11] 4,162,300
[45] Jul. 24, 1979

[54] PRODUCTION OF MADDRELL SALT

[75] Inventors: Renate Adrian; Raban von Schenck, both of Hürth; Klaus Somme, Heidelberg; Hermann Weber, Hemsbach, all of Fed. Rep. of Germany

[73] Assignee: Hoechst Aktiengesellschaft, Hurth-Knapsack, Fed. Rep. of Germany

[21] Appl. No.: 945,502

[22] Filed: Sep. 25, 1978

Related U.S. Application Data

[63] Continuation of Ser. No. 786,372, Apr. 11, 1977, abandoned.

[30] Foreign Application Priority Data

Apr. 15, 1976 [DE] Fed. Rep. of Germany ....... 2616740

[51] Int. Cl.$^2$ .................. C01B 15/16; C01B 25/26
[52] U.S. Cl. .................................................... 423/314
[58] Field of Search ........................................ 423/314

[56] References Cited

U.S. PATENT DOCUMENTS

| 3,230,039 | 1/1966 | Metcalf et al. | 423/314 |
| 3,367,737 | 2/1968 | Moore et al. | 423/314 |
| 3,393,974 | 7/1968 | Rohlfs et al. | 423/314 |
| 4,029,742 | 6/1977 | Sommer et al. | 423/314 |

Primary Examiner—O. R. Vértiz
Assistant Examiner—G. A. Heller
Attorney, Agent, or Firm—Connolly and Hutz

[57] ABSTRACT

Pure Maddrell salt is produced by heating sodium phosphate to temperatures of 250° to 420° C. The sodium phospate used as starting material is sodium trimetaphosphate or a mixture of sodium trimetaphosphate with Maddrell salt, monosodium orthophosphate or disodium pyrophosphate, the mixture containing Na and P in a molar ratio of 1:1. Prior to heating the starting material, it is admixed with 0.5 to 5 weight% of orthophosphoric acid, polyphosphoric acid, phosphorus pentoxide or at least one salt of a volatile base forming polyphosphoric acid at the temperatures specified. The resulting mixture is calcined over the period necessary to transform the starting material to Maddrell salt.

4 Claims, No Drawings

PRODUCTION OF MADDRELL SALT

This application is a continuation of application Ser. No. 786,372 filed Apr. 11, 1977 now abandoned.

The present invention relates to a process for making pure Maddrell salt by heating sodium phosphate to temperatures of 250° to 420° C.

All processes described heretofore for making Maddrell salt are substantially based on the dehydration of monosodium phosphate or acid disodium pyrophosphate (of. U.S. Pat. No. 2,356,799; J. Am. Chem. Soc. 81, 79 (1959); J. R. van Wazer, Phosphorus and its Compounds, vol. I, 668; German Patent Specification "Auslegeschrift" No. 1,667,569; Z. anorg. allg. Chem. 258, 52; Analytical Chem. 30, 1101 (1958); and German Pat. No. 2,161,600).

The processes disclosed heretofore are carried out with considerable technical expenditure primarily in an attempt to avoid the formation of sodium trimetaphosphate which is normally always obtained upon the dehydration of monosodium phosphate or disodium pyrophosphate.

The present invention now unexpectedly provides a process for making pure Maddrell salt by heating sodium phosphate to temperatures of 250° to 420° C., which comprises: using as the sodium phosphate starting material sodium trimetaphosphate or a mixture of sodium trimetaphosphate with Maddrell salt, monosodium orthophosphate or disodium pyrophosphate, the mixture containing Na and P in a molar ratio of 1:1, admixing the starting material, prior to heating it, with 0.5 to 5 weight% of orthophosphoric acid, polyphosphoric acid, phosphorus pentoxide or one or more salts of a volatile base forming polyphosphoric acid at the temperature specified, especially an ammonium ortho- or polyphosphate; and calcining the resulting mixture over the period necessary, preferably 60 to 120 minutes, to transform the starting material to Maddrell salt.

It is more particularly good practice in the process of the present invention to use such mixtures of sodium trimetaphosphate with Maddrell salt, monosodium orthophosphate or disodium pyrophosphate as contain at least 2 weight%, preferably 2 to 75%, of sodium trimetaphosphate. The compounds just recited may be mixed with, or sprayed on to, the starting material prior to heating it.

The steps described hereinabove would not have been expected, even by the expert, to result in the present invention inasmuch as tests have shown (cf. Example 1) that sodium trimetaphosphate cannot, in the absence of special addends, be transformed under control to pure Maddrell salt by calcination.

The term "pure Maddrell salt" as used herein denotes a product of which more than 95 weight%, preferably 98 to 100 weight%, is Maddrell salt.

The process of the present invention compares favorably with the prior art methods inasmuch as it is the first to enable sodium trimetaphosphate which is invariably obtained in more or less great proportions upon the dehydration of monosodium orthophosphate and disodium pyro-phosphate to be transformed to Maddrell salt. This possibility is of particular interest in all those cases in which the starting material is dehydrated in a spray tower and the resulting sodium trimetaphosphate fractions are converted in a second step to Maddrell salt. In this event, little or substantially no water need be evaporated which is highly desirable, and it is possible for the reaction to be effected with thorough agitation in a heated kneader, double screw mixer or rotating tube reactor, which is not liable to become fouled with agglutinating material.

In other words, it is possible to transform sodium trimetaphosphate directly to pure Maddrell salt with the use of recycle material which impaires the yield of desirable product. In addition to this, it is possible by thoroughly mixing the reactants together to obtain rapid reaction rates and high throughput rates with little expenditure of energy.

EXAMPLE 1: (Comparative Example)

100 g of sodium trimetaphosphate was heated to 380° C. in a muffle furnace. Specimens were taken at intervals of 1 hour and tested. All specimens continued to consist of sodium trimetaphosphate. Even after 6 days, the specimens could not be found to contain more than 1 weight% of Maddrell salt.

EXAMPLE 2

100 g of sodium trimetaphosphate was intimately mixed with 5 g of finely ground ammonium polyphosphate and the resulting mixture was heated for 1 hour to 380° C. in a muffle furnace. 98 weight% of the reaction product was Maddrell salt.

EXAMPLE 3

100 g of a mixture consisting of 75% of sodium trimetaphosphate and 25% of Maddrell salt was intimately mixed with 5 g of finely ground ammonium polyphosphate, and the resulting mixture was heated for 1 hour to 380° C. in a muffle furnace. 98% of the reaction product was Maddrell salt.

EXAMPLE 4

A mixture consisting of 70% of sodium trimetaphosphate, 25% of Maddrell salt and 5% of disodium phosphate was placed in a rotating tube, 3 weight% of phosphoric acid (75% strength) was sprayed on to the mixture, which was heat-treated at a throughput rate of 20 kg/h and thereby converted to Maddrell salt of 98.5% strength. The mixture which was allowed to remain in the rotating tube for 2 hours reached a temperature of 300° C.

We claim:

1. A process for making pure Maddrell salt by heating a sodium phosphate to temperatures of 250° to 420° C., which comprises using as the sodium phosphate starting material sodium trimetaphosphate, admixing the starting material, prior to heating it, with 0.5 to 5 weight % of orthophosphoric acid, polyphosphoric acid, phosphorus pentoxide or at least one salt of a volatile base forming polyphosphoric acid at the temperatures specified, and calcining the resulting mixture over the period necessary to transform the starting material to Maddrell salt.

2. The process as claimed in claim 1, wherein as starting material is used a mixture of the sodium trimetaphosphate with Maddrell salt, monosodium orthophosphate or disodium pyrophosphate, the mixture containing Na and P in a molar ratio of 1:1 and containing 70 to 75 weight % of sodium trimetaphosphate.

3. The process as claimed in claim 1, wherein the starting material is calcined over a period of 60 to 120 minutes.

4. The process as claimed in claim 1, wherein the salt of a volatile base forming polyphosphoric acid at the temperatures specified is an ammonium orthophosphate or ammonium polyphosphate.

* * * * *

UNITED STATES PATENT AND TRADEMARK OFFICE
CERTIFICATE OF CORRECTION

PATENT NO. : 4,162,300
DATED : July 24, 1979
INVENTOR(S) : Adrian et al

It is certified that error appears in the above-identified patent and that said Letters Patent are hereby corrected as shown below:

COVER PAGE, left-hand column, item "[73] Assignee:"

change "Hurth-Knapsack" to --Frankfurt/Main--.

Signed and Sealed this

Twenty-ninth Day of April 1980

[SEAL]

Attest:

SIDNEY A. DIAMOND

Attesting Officer

Commissioner of Patents and Trademarks